(12) United States Patent
Merino Lopez

(10) Patent No.: US 10,336,134 B2
(45) Date of Patent: *Jul. 2, 2019

(54) FLEXIBLE WHEEL RIM WITH FLOATING HOOKS

(71) Applicant: COMPAGNIE GENERALE DES ETABLISSEMENTS MICHELIN, Clermont-Ferrand (FR)

(72) Inventor: José Merino Lopez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 360 days.

This patent is subject to a terminal disclaimer.

(21) Appl. No.: 15/106,802

(22) PCT Filed: Dec. 17, 2014

(86) PCT No.: PCT/EP2014/078177
§ 371 (c)(1),
(2) Date: Jun. 20, 2016

(87) PCT Pub. No.: WO2015/091621
PCT Pub. Date: Jun. 25, 2015

(65) Prior Publication Data
US 2017/0008338 A1    Jan. 12, 2017

(30) Foreign Application Priority Data

Dec. 20, 2013  (FR) .................................... 13 63245

(51) Int. Cl.
*B60B 25/02*    (2006.01)
*B60B 25/00*    (2006.01)
(Continued)

(52) U.S. Cl.
CPC .............. *B60B 25/006* (2013.01); *B60B 5/02* (2013.01); *B60B 21/02* (2013.01); *B60B 25/004* (2013.01);
(Continued)

(58) Field of Classification Search
CPC ......... B60B 21/02; B60B 25/006; B60B 5/02; B60B 2900/551; B60B 25/06; B60B 25/004; B60B 25/02; B60C 15/16
See application file for complete search history.

(56) References Cited

U.S. PATENT DOCUMENTS 1,593,877 A    7/1926  Littman
4,373,567 A *  2/1983  Declercq ................. B60B 21/10
                                                         152/379.3

(Continued)

FOREIGN PATENT DOCUMENTS

FR        459 206       10/1913
JP        58-118401      7/1983
JP        2003-260904    9/2003

*Primary Examiner* — S. Joseph Morano
*Assistant Examiner* — Scott A Browne
(74) *Attorney, Agent, or Firm* — Cozen O'Connor

(57) ABSTRACT

Vehicle rim for mounting of a tire, comprising: an axially central part (20) comprising a disc; two lateral parts (31, 32), at least one of the lateral parts being separate from the axially central part, each of the lateral parts having a rim seat to receive a bead of a tire, the axially central part and the two lateral parts being made from a rigid matrix; an intermediate part (41, 42) that forms the only mechanical link between the axially central part and each lateral part that is separate from the axially central part, this intermediate part being made of a flexible matrix, the Young's modulus of uniaxial extension of the flexible matrix being greater than and equal to 50 MPa and less than or equal to 400 MPa; wherein the Young's modulus of uniaxial extension of the rigid matrix is greater than or equal to 5 GPa.

15 Claims, 2 Drawing Sheets

(51) Int. Cl.
 *B60B 25/06* (2006.01)
 *B60B 5/02* (2006.01)
 *B60B 21/02* (2006.01)

(52) U.S. Cl.
 CPC .............. *B60B 25/02* (2013.01); *B60B 25/06* (2013.01); *B60B 2360/10* (2013.01); *B60B 2360/32* (2013.01); *B60B 2360/324* (2013.01); *B60B 2360/36* (2013.01); *B60B 2360/50* (2013.01); *B60B 2900/133* (2013.01); *B60B 2900/212* (2013.01); *B60B 2900/551* (2013.01)

(56) References Cited

U.S. PATENT DOCUMENTS

| | | | |
|---|---|---|---|
| 4,483,729 A | 11/1984 | Fujisaki et al. | |
| 4,650,257 A * | 3/1987 | Woods | B60B 21/02 152/378 R |
| 6,145,936 A * | 11/2000 | Alberti | B60B 1/041 301/56 |
| 6,425,641 B1 | 7/2002 | Herting | |
| 6,626,217 B2 * | 9/2003 | Bestgen | B60B 25/18 152/379.4 |
| 2005/0274015 A1 * | 12/2005 | Tanaka | B21D 53/26 29/894.354 |
| 2008/0277996 A1 * | 11/2008 | Ono | B60B 21/025 301/63.106 |
| 2010/0200131 A1 * | 8/2010 | Iwase | B29D 30/00 152/209.1 |
| 2011/0041975 A1 * | 2/2011 | Iizuka | B60C 5/04 152/512 |
| 2012/0001476 A1 * | 1/2012 | Yuan | C08L 77/00 301/5.1 |
| 2016/0311255 A1 * | 10/2016 | Ahouanto | B60C 15/0213 |

\* cited by examiner

FLEXIBLE WHEEL RIM WITH FLOATING HOOKS

RELATED APPLICATIONS

This is a U.S. National Phase Application under 35 USC 371 of International Application PCT/EP2014/078177 filed on Dec. 17, 2014.

This application claims the priority of French application no. 1363245 filed Dec. 20, 2013, the entire content of which is hereby incorporated by reference.

FIELD OF THE INVENTION

The present invention relates to wheels intended to be equipped with tires, and more particularly to the rims of these wheels.

BACKGROUND

When a vehicle equipped with wheels provided with tires runs on the roadway, the imperfect state of the latter can have a negative effect on the comfort of the user of the vehicle, increasing the noise to which this user is exposed, and on the integrity of the vehicle and notably of the tires. Specifically, the latter are primarily subjected to impacts from, for example, contact with a kerb or with a "pothole", that is to say a cavity in the roadway brought about by deterioration of its surface.

SUMMARY OF THE INVENTION

One of the objectives of the present invention is to define a wheel rim intended to be equipped with a tire, making it possible to reduce the risk of damage to the tire that results from impacts of the kerb or pothole impact type, and to improve the comfort of the user of a vehicle of which the wheels are equipped with such rims, reducing the noise in the vehicle and reducing the discomfort brought about by passing over minor irregularities in the road, for example manhole covers.

This objective is achieved by a vehicle rim, with symmetry of revolution, intended for the mounting of a tire, comprising:

an axially central part comprising a disc;

two lateral parts, at least one of the lateral parts (and preferably both lateral parts) being separate from the axially central part, each of the lateral parts being provided with a rim seat intended to receive a bead of a tire, the axially central part and the two lateral parts being made from a rigid matrix that can be reinforced by a reinforcement;

an intermediate part that forms the only mechanical link between the axially central part and each lateral part that is separate from the axially central part, this intermediate part being made of a flexible matrix without any reinforcements, the Young's modulus of uniaxial extension of the flexible matrix being greater than and equal to 50 MPa and less than or equal to 400 MPa, and preferably greater than and equal to 70 MPa and less than or equal to 200 MPa, wherein the Young's modulus of uniaxial extension of the rigid matrix is greater than or equal to 5 GPa.

According to a first embodiment, the contact between the axially central part and each intermediate part is made by one end of the axially central part which passes into the intermediate part.

This end of the axially central part may comprise an overthickness that makes it possible to anchor the end in the intermediate part.

According to a second embodiment, which is advantageously combined with the first embodiment, the contact between each lateral part that is separate from the axially central part and the intermediate part in contact therewith is also made by one end of the lateral part which passes into the intermediate part.

This end of the lateral part may also comprise an overthickness that makes it possible to anchor the end in the intermediate part.

According to a third embodiment, each lateral part that is separate from the axially central part is entirely covered with the material of which the flexible matrix of the intermediate part in contact therewith is made. This embodiment makes it possible to increase the contact surface area so as to improve the contact between the lateral part and the intermediate part. Moreover, a transition that is too abrupt can serve as the starting point for a crack or unsticking.

According to a fourth, particularly advantageous embodiment, the rim comprises two intermediate parts, and the two intermediate parts are symmetrical to one another.

The material of which the flexible matrix of each intermediate part is made may notably be polyurethane, a rubber composition or a thermoplastic elastomer. Polyurethane and thermoplastic elastomers have the advantage of being able to be injection-moulded. On account of their rigidities, polyurethanes are particularly suitable for use as an intermediate part.

The material of which the rigid matrix of the axially central part and the two lateral parts is made may notably be a metal or a metal alloy.

It is particularly advantageous to provide for the Young's modulus of uniaxial extension of the rigid matrix to be greater than the Young's modulus of uniaxial extension of the flexible matrix by a factor of greater than or equal to 100. In this way, the lateral parts are actually floating and the forces transmitted in the event of an impact are smaller.

Of course, it may be advantageous to combine several or even all of the embodiments mentioned.

Figure 1:
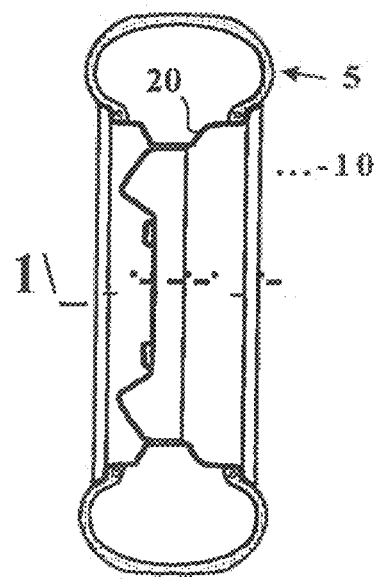
FIG. 1 shows, in radial cross section, a tire-wheel assembly.

All of the figures are schematic.

DETAILED DESCRIPTION OF THE DRAWINGS

Where the term "radial" is used, a distinction should be made between several different uses of the word by a person skilled in the art. Firstly, the expression refers to a radius of the rim (and of the tire with which the latter is equipped). It is within this meaning that a point P1 is said to be "radially inside" a point P2 (or "radially on the inside" of the point P2) if it is closer to the rotation axis than the point P2. Conversely, a point P3 is said to be "radially outside" a point P4 (or "radially on the outside" of the point P4) if it is further away from the rotation axis of the tire than the point P4. Progress will be said to be "radially inwards (or outwards)" when it is in the direction of smaller (or larger) radii. It is this sense of the term that applies also when radial distances are being discussed.

On the other hand, a thread or a reinforcement is said to be "radial" when the thread or the reinforcement elements of the reinforcement make an angle greater than or equal to 80° and less than or equal to 90° with the circumferential direction. Let us specify that, in this document, the term "thread" should be understood in a very general sense and comprises threads in the form of monofilaments, multifilaments, a cord, a folded yarn or an equivalent assembly, irrespective of the material of which the thread is made or of the surface treatment it has received in order to encourage it to bond with the rubber.

Finally, a "radial cross section" or "radial section" means here a cross section or a section in a plane which contains the rotation axis of the rim (and of the tire with which the latter is equipped).

An "axial" direction is a direction parallel to the rotation axis of the rim (and of the tire with which the latter is equipped). A point P5 is said to be "axially inside" a point P6 (or "axially on the inside" of the point P6) if it is closer to the median plane of the rim than the point P6. Conversely, a point P7 is said to be "axially outside" a point P8 (or "axially on the outside" of the point P8) if it is further away from the median plane of the rim than the point P8. The "median plane" of the rim is the plane which is perpendicular to the rotation axis of the rim and which is situated equidistantly from the rim seats intended to receive a bead of a tire.

A "circumferential" direction is a direction which is perpendicular both to a radius of the rim and to the axial direction.

In the scope of this document, the expression "rubber composition" denotes a composition of rubber comprising at least one elastomer and a filler.

The "Young's modulus of uniaxial extension" of a material is understood here as meaning the modulus of extension measured using a tensile test. For the flexible matrices and the textile reinforcement elements, the process according to the standard DIN EN ISO 527-2 was carried out on a test specimen of type A according to the standard DIN EN ISO 3167 at a pull rate of 1 mm/min. For the rigid matrices and the metal reinforcement elements, by contrast, the process according to the standard ASTM E111-04 (2010) was carried out.

FIG. 1 shows, in radial cross section, a tire-wheel assembly comprising a tire 5. The tire 5 is mounted on a hollow mounting rim 10 in accordance with the standards of the ETRTO (European Tire and Rim Technical Organisation). The common rotation axis bears the reference 1.

Figure 2:
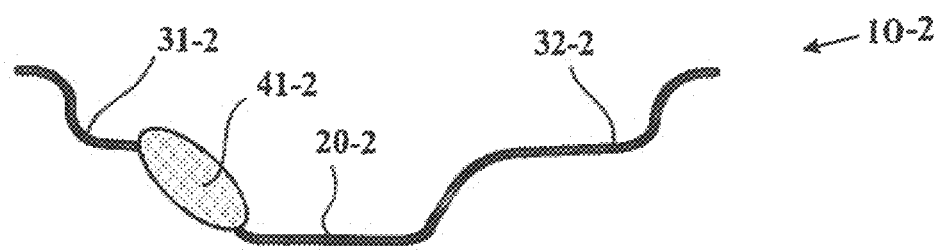
FIGS. 2 to 6 each show a part of a rim according to an embodiment of the invention.

FIG. 2 shows, in radial cross section, a part of a rim 10-2 according to the invention. This rim 10-2 comprises an axially central part 20-2 comprising a disc (not shown), two lateral parts 31-2 and 32-2 and an intermediate part 41-2. The lateral part 31-2 is separate from the axially central part 20-2 while the lateral part 32-2 is in one piece therewith. Each of the lateral parts 31-2 and 32-2 is provided with a rim seat intended to receive a bead of a tire (not shown). The axially central part 20-2 and the two lateral parts 31-2 and 32-2 are made of a rigid matrix that can be reinforced by a reinforcement. In the present case, these parts are made of steel having a Young's modulus of uniaxial extension equal to 190 GPa. The intermediate part 41-2 forms the only mechanical link between the axially central part 20-2 and the lateral part 31-2; it is made of a flexible matrix, in the present case polyurethane. The Young's modulus of uniaxial extension of this flexible matrix is equal to 90 MPa.

Figure 3:
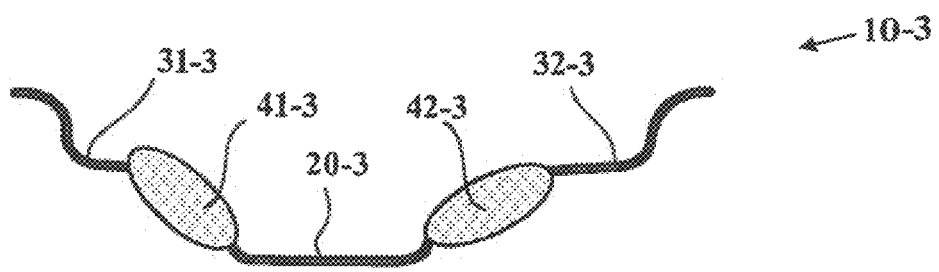

FIG. 3 shows, in radial cross section, a part of a rim 10-3 according to another embodiment of the invention. In contrast to the rim 10-2 in FIG. 2, the two lateral parts 31-3 and 32-3 are separate from the axially central part 20-3 and there are two intermediate parts 41-3 and 42-3 made of polyurethane.

Figure 4:
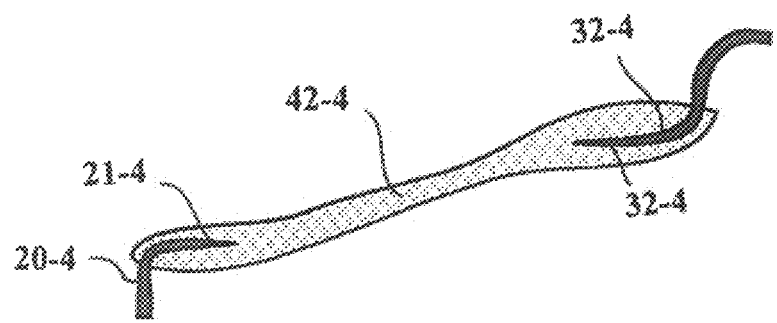

FIG. 4 shows, in radial cross section, a part of another rim according to the invention. Here, the contact between the axially central part 20-4 and the intermediate part 42-4 is made by one end 21-4 of the axially central part 20-4 which passes into the intermediate part 42-4. Similarly, the contact between the lateral part 32-4 (which is separate from the axially central part 20-4) and the intermediate part 42-4 in contact therewith is made by one end 34-4 of the lateral part 32-4 which passes into the intermediate part 42-4.

Figure 5:
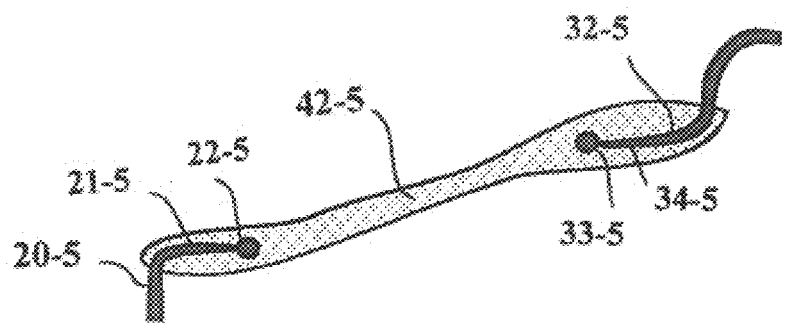

FIG. 5 shows, in radial cross section, a part of another rim according to the invention. In the present case, the end 21-5 of the axially central part 20-5 comprises an overthickness 22-5 that makes it possible to anchor the end in the intermediate part 42-5. Similarly, the end 34-5 of the lateral part 32-5 comprises an overthickness 33-5 that makes it possible to anchor the end 34-5 in the intermediate part 42-5.

Figure 6:
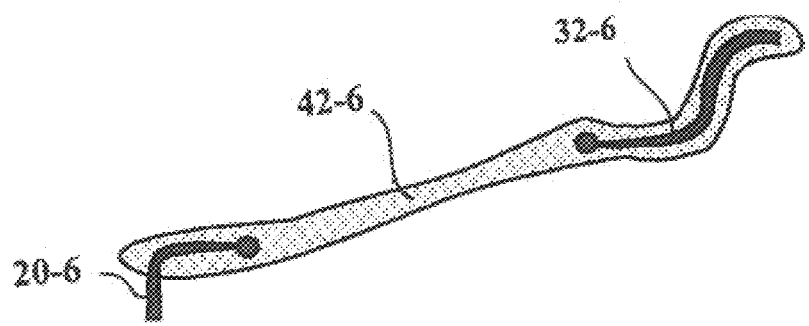

FIG. 6 shows, in radial cross section, a part of another rim according to the invention. Here, the lateral part 32-6 (which is separate from the axially central part 20-6) is entirely covered with the material of which the flexible matrix of the intermediate part 42-6 in contact therewith is made.

Tests were carried out with a rim comprising two flexible intermediate parts corresponding to FIG. 5, the intermediate part being made of polyurethane having a Young's modulus of 90 MPa. The wheel was mounted on the front axle assembly of a Peugeot 307 HDI vehicle. Noise measurements made it possible to note a significant decrease in the noise perceived at the driver's seat over the bands 80-100 Hz, 140-170 Hz and 340-380 Hz, compared with a wheel comprising an equivalent rim that does not have flexible intermediate parts. Kerb impact tests also confirmed an improvement in the resistance of the tire-wheel assembly to impacts.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A vehicle wheel, with symmetry of revolution, adapted for the mounting of a tire, comprising:
   an axially central part comprising a disc;
   a first lateral part and a second lateral part, at least the first lateral part being separate from the axially central part, each of the first lateral part and the second lateral part being provided with a rim seat configured to receive a bead of a tire, the axially central part, the first lateral part, and the second lateral part being made from a rigid matrix;
   a first intermediate part between the axially central part and the first lateral part, the first intermediate part forming the only mechanical link between the axially central part and the first lateral part, the first intermediate part comprising a flexible matrix, the Young's modulus of uniaxial extension of the flexible matrix being greater than or equal to 50 MPa and less than or equal to 400 MPa;
   wherein the Young's modulus of uniaxial extension of the rigid matrix is greater than or equal to 5 GPa.

2. The vehicle wheel according to claim 1, wherein a contact between the axially central part and the first intermediate part is made by one end of the axially central part which passes into the first intermediate part.

3. The vehicle wheel according to claim 2, wherein said end of the axially central part has an increased thickness that is greater than the thickness of the remainder of the axially central part, to anchor the end of the axially central part in the first intermediate part.

4. The vehicle wheel according to claim 2, wherein the contact between the first lateral part and the first intermediate part is made by the one end of the first lateral part which passes into the first intermediate part.

5. The vehicle wheel according to claim 4, wherein said end of the first lateral part has an increased thickness that is greater than the thickness of the remainder of the first lateral part, to anchor the end of the first lateral part in the first intermediate part.

6. The vehicle wheel according to claim 1, wherein the first lateral part is entirely covered with the same material as the flexible matrix of the first intermediate part in contact.

7. The vehicle wheel according to claim 1, wherein the second lateral part is separate from the axially central part, the vehicle rim further comprising:
a second intermediate part that forms the only connection mechanical link between the axially central part and the second lateral part, wherein the first intermediate part and the second intermediate part are symmetrical to one another.

8. The vehicle wheel according to claim 1, wherein the material of which the flexible matrix of the first intermediate part is made comprises polyurethane.

9. The vehicle wheel according to claim 1, wherein the material of which the flexible matrix of the intermediate part is made comprises a rubber composition.

10. The vehicle wheel according to claim 1, wherein the material of which the flexible matrix of the intermediate part is made comprises a thermoplastic elastomer.

11. The vehicle wheel according to claim 1, wherein the material of which the rigid matrix of the axially central part, the first lateral part, and the second lateral part are made comprises metal or a metal alloy.

12. The vehicle wheel according to claim 1, wherein the Young's modulus of uniaxial extension of the rigid matrix is greater than the Young's modulus of uniaxial extension of the flexible matrix by a factor of greater than or equal to 100.

13. The vehicle wheel according to claim 1, wherein:
the second lateral part is separate from said axially central part; and
a second intermediate part is the only mechanical link between the second lateral part and the axially central part.

14. The vehicle wheel according to claim 13, wherein the axially central part is between the first intermediate part and the second intermediate part.

15. The vehicle wheel according to claim 1, wherein the axially central part, the first lateral part, and/or the second lateral part is reinforced by reinforcement.

* * * * *